(12) United States Patent
Grun et al.

(10) Patent No.: US 9,303,412 B2
(45) Date of Patent: Apr. 5, 2016

(54) FLOOR COVERING AND METHOD FOR PRODUCING THE SAME

(75) Inventors: Gregor Grun, Zweibrucken (DE); Mario Kroger, Bruchsal (DE); Dieter Rischer, Abtsteinach (DE)

(73) Assignee: Nora Systems GmbH, Weinheim (DE)

( * ) Notice: Subject to any disclaimer, the term of this patent is extended or adjusted under 35 U.S.C. 154(b) by 402 days.

(21) Appl. No.: 13/814,778

(22) PCT Filed: Aug. 5, 2011

(86) PCT No.: PCT/EP2011/003937
§ 371 (c)(1),
(2), (4) Date: Feb. 7, 2013

(87) PCT Pub. No.: WO2012/028240
PCT Pub. Date: Mar. 8, 2012

(65) Prior Publication Data
US 2013/0149547 A1   Jun. 13, 2013

(30) Foreign Application Priority Data

Sep. 1, 2010   (DE) .......................... 10 2010 036 121

(51) Int. Cl.
| E04F 15/10 | (2006.01) |
| B29C 43/30 | (2006.01) |
| B29C 70/64 | (2006.01) |
| B29C 35/02 | (2006.01) |
| B29C 35/08 | (2006.01) |
| B29B 13/08 | (2006.01) |
| B29K 9/06 | (2006.01) |
| B29L 31/30 | (2006.01) |
| B29L 31/00 | (2006.01) |

(52) U.S. Cl.
CPC .............. *E04F 15/105* (2013.01); *B29B 13/08* (2013.01); *B29C 43/30* (2013.01); *B29C 70/64* (2013.01); *B29C 35/02* (2013.01); *B29C 2035/085* (2013.01); *B29K 2009/06* (2013.01); *B29L 2031/3017* (2013.01); *B29L 2031/732* (2013.01); *Y10T 428/31938* (2015.04)

(58) Field of Classification Search
None
See application file for complete search history.

(56) References Cited

U.S. PATENT DOCUMENTS

| 5,647,939 A * | 7/1997 | Gee et al. .................... 156/272.6 |
| 2001/0056155 A1 | 12/2001 | Edson |
| 2008/0020179 A1 * | 1/2008 | Graab et al. .................. 428/141 |

FOREIGN PATENT DOCUMENTS

| CN | 1380360 | 11/2002 |
| DE | 283147 A5 | 3/1990 |
| DE | 44 05 589 C1 | 1/1995 |
| DE | 198 48 137 A1 | 5/2000 |
| EP | 0 324 430 A1 | 6/1995 |
| EP | 0 721 834 A1 | 7/1996 |
| EP | 1 884 607 A2 | 2/2008 |
| JP | 2003-261716 | 9/2003 |
| JP | 2004-316372 | 11/2004 |
| KR | 10-2008-0009640 | 1/2008 |

OTHER PUBLICATIONS

Korean Office Action for Korean Patent Application No. 10-2013-7007807 dated Nov. 11, 2015.

* cited by examiner

*Primary Examiner* — Sheeba Ahmed
(74) *Attorney, Agent, or Firm* — Greer, Burns & Crain, Ltd.

(57) ABSTRACT

A floor covering comprising an essentially sheet-shaped or plate-shaped matrix made of an elastomeric material. The matrix is provided with particles where the particles are made of a thermoplastic elastomer.

11 Claims, 2 Drawing Sheets

FLOOR COVERING AND METHOD FOR PRODUCING THE SAME

BACKGROUND

The invention relates to a floor covering, comprising an essentially sheet-shaped or plate-shaped matrix made of an elastomeric material, wherein the matrix is provided with particles.

Such a floor covering is known from German patent DE 198 48 137 B4. The floor covering shown there is provided with particles in order to impart it with color, these particles being scattered onto the base material that has been shaped into a sheet. The particles consist of an unvulcanized rubber material. The subsequent thermal treatment softens the particles so that they are deformed through the effect of mechanical forces. This gives rise to a homogeneous bonding of the particles.

The use of the unvulcanized rubber particles described above is thus especially well-suited for coloring a floor covering. However, they are not suitable to impart the floor covering with a pattern in a prescribed form since the particles are deformed irregularly within the scope of the subsequent mechanical and thermal treatment. In order to give a floor covering a prescribed pattern, the particles can be made of an already vulcanized rubber material. They are dimensionally stable, even during subsequent mechanical and thermal process steps. Due to the high demands that are made in terms of dimensional stability during the subsequent process steps, however, the shape diversity on the one hand, and the material selection for the particles on the other hand are limited.

SUMMARY

The invention is based on the objective of putting forward a floor covering that contains easily produced particles and that has a pattern in a prescribed form.

In order to achieve the objective, the particles are made of a thermoplastic elastomer. Thermoplastic elastomers (TPE) are plastics that, at room temperature, have properties comparable to those of an elastomer and that, at high temperatures, have properties comparable to those of a thermoplastic. As a result, an object made of thermoplastic elastomer has a relatively low hardness and a rubber-like resilience at room temperature. At high temperatures, the cross-linking points of the thermoplastic elastomer are reversibly detached so that the material can be processed by means of the methods commonly used in the thermoplastic industry, for example, injection molding or extrusion, wherein the elastomeric properties are restored after the material has cooled off. Thermoplastic elastomers are available in a wide range of colors and particularly also in transparent form, wherein especially the use of a transparent thermoplastic elastomer allows the production of a partially transparent floor covering or else, if the particles are colored, of a partially translucent floor covering. Here, it is especially advantageous that a transparent thermoplastic elastomer can be made in a hardness that essentially corresponds to the hardness of the vulcanized elastomeric material of the matrix. Thus, it is possible to produce an layable floor covering that has similar properties over its entire surface area. In contrast, a transparently configured vulcanizable elastomeric material usually has only a low hardness, so that the particles are not as hard as the base material of the matrix, as a result of which the floor covering would not have continuously uniform properties throughout.

Preferably, the particles are pretreated by means of ionizing radiation. Ionizing radiation includes any kind of radiation that can remove electrons from atoms or molecules, so that ions or molecule residues remain. These reactive particles react during the pretreatment with the polymers of the thermoplastic elastomer in such a way that they at least partially irreversibly cross-link. This cross-linking occurs without a cross-linking agent or vulcanization agent having to be added to the material. Due to this at least partial cross-linking, the particles are dimensionally stable, even under exposure to high temperatures, while retaining their elastomeric properties. Thus, the particles retain their prescribed form, even under mechanical load and exposure to high temperatures, for example, during vulcanization of the matrix. Thus, particles can be produced in a wide variety of prescribed forms and admixed into the matrix. Cross-linking by means of ionizing radiation is especially advantageous as it is to be carried out without exposure to pressure or high temperatures, so that the particles added for the cross-linking retain their form during the radiation and remain dimensionally stable after the cross-linking.

The particles can be configured at least partially to be transparent. Particularly thermoplastic elastomers are available in a wide range of colors and especially also in transparent form, wherein especially the use of a transparent thermoplastic elastomer allows the production of a partially transparent floor covering or, if the particles are colored, of a partially translucent floor covering. Furthermore, the floor covering can be made in such a way that it is translucent. Here, it is especially advantageous that a transparent thermoplastic elastomer can be made in a hardness that essentially corresponds to the hardness of the vulcanized elastomeric material of the matrix. Thus, it is possible to produce a floor covering that has similar properties over its entire surface area. In contrast, a transparently configured vulcanizable elastomeric material always has lower hardness than the thermoplastic material so that the floor covering does not have continuously uniform properties.

Furthermore, the transparently configured thermoplastic material can also be provided with effect pigments. Effect pigments give the floor covering angle-dependent variations in the color tone or gloss. They are usually made of metallic particles that have specific optical properties. The effect of such pigments appears particularly clearly in transparent materials, wherein the pigments are especially firmly incorporated into the matrix of the transparent thermoplastic material.

The elastomeric material of the matrix can be made of a thermoplastic elastomer or of a rubber. Floor coverings made of such materials have advantageous properties of use such as non-slip characteristics, impact sound insulation and low electrostatic charging. Furthermore, the polymers can be selected in such a way that the floor covering also has an advantageous, especially low-emission, fire behavior. Advantageous materials for the matrix of the floor covering are nitrile butadiene rubber (NBR), styrene butadiene rubber (SBR), butadiene rubber (BR), ethylene propylene diene monomer rubber (EPDM), natural rubber (NR) and isoprene rubber (IR).

The particles can be made from semi-finished products. For this purpose, the thermoplastic elastomer undergoes a shaping process before being mixed into the matrix. Advantageous shaping processes are injection molding and extrusion. These methods can be used to produce particles in a wide variety of shapes. Possible shapes are cylindrical sections with a round, circular ring-shaped, star-shaped or oval cross sections. In order to produce the particles, injection molding is used to make free forms, or else extrusion is used to make an extruded profile that can subsequently be cut to the desired length. Preferably, the particles produced in this manner undergo cross-linking by means of ionizing radiation so that they retain their shape during the further processing in the matrix.

The elastomeric material of the matrix and the thermoplastic elastomer of the particles preferably each have at least one matching monomer. The identical monomers of the two components have good adhesive properties relative to each other, resulting in an especially good adhesion of the particles in the matrix. The adhesion can be improved even further by using an adhesion promoter. Advantageous material combinations are TPEs containing styrene, wherein the elastomeric material of the matrix likewise contains styrene and TPE containing butadiene, wherein the elastomeric material of the matrix likewise contains butadiene. TPEs containing styrene include, for example, styrene butadiene block copolymer (SBS), hydrogenated styrene butadiene block copolymer (SEBS), styrene isoprene block copolymer (SIS), hydrogenated styrene isoprene block copolymer (SEBS). Here, the SBS and the SEBS have a styrene monomer as well as, at least in part, butadiene monomers. Thus, particles from this TPE are also advantageously suitable for use in a matrix that contains butadiene monomers.

When a thermoplastic elastomer is used, the materials of the matrix and of the particles should preferably be coordinated with each other in such a way that they have likewise matching or at least chemically similar monomers in order to achieve the best possible compatibility of the materials with each other.

With the method according to the invention for producing a floor covering, first of all, particles are made from a thermoplastic elastomer and subsequently treated with ionizing radiation, and the particles pretreated in this manner are mixed into an elastomeric material that is subsequently further processed into a sheet-shaped or plate-shaped matrix. Due to ionizing radiation the thermoplastic elastomer is at least partial cross-linked. The particles pretreated in this manner are also dimensionally stable, even under exposure to temperatures of more than 160° C. and a pressure of up to 200 bar. As a result, the particles admixed into the matrix retain their shape, even during the process steps that are typical for the production of a floor covering, comprising mechanical processes such as mixing, calandering and extrusion as well as thermal treatments such as preheating and vulcanization. As a result, patterned floor coverings can be produced, wherein the pattern of the floor covering is prescribed by the shaping of the particles.

The treatment with ionizing radiation can comprise radiation with $\beta$ and/or $\gamma$ rays. These rays are especially energy-rich and penetrate deep into the material. A radiation treatment with a radiation dose of at least 150 kGy has proven to be advantageous. Such a radiation dose brings about significant cross-linking. The treatment takes place without exposure to pressure or high temperatures.

The particles can be made from a semi-finished product. The semi-finished product can be produced by means of the methods generally known from the processing of thermoplastic materials such as injection molding or extrusion. These semi-finished products are subsequently cut, if applicable, and are cross-linked by means of a radiation treatment. The above-mentioned methods allow the production of semi-finished products in a wide variety of shapes so that a floor covering with different patterns can be produced.

Several embodiments of the floor covering according to the invention are explained in greater detail below.

DETAILED DESCRIPTION

Figure 1:
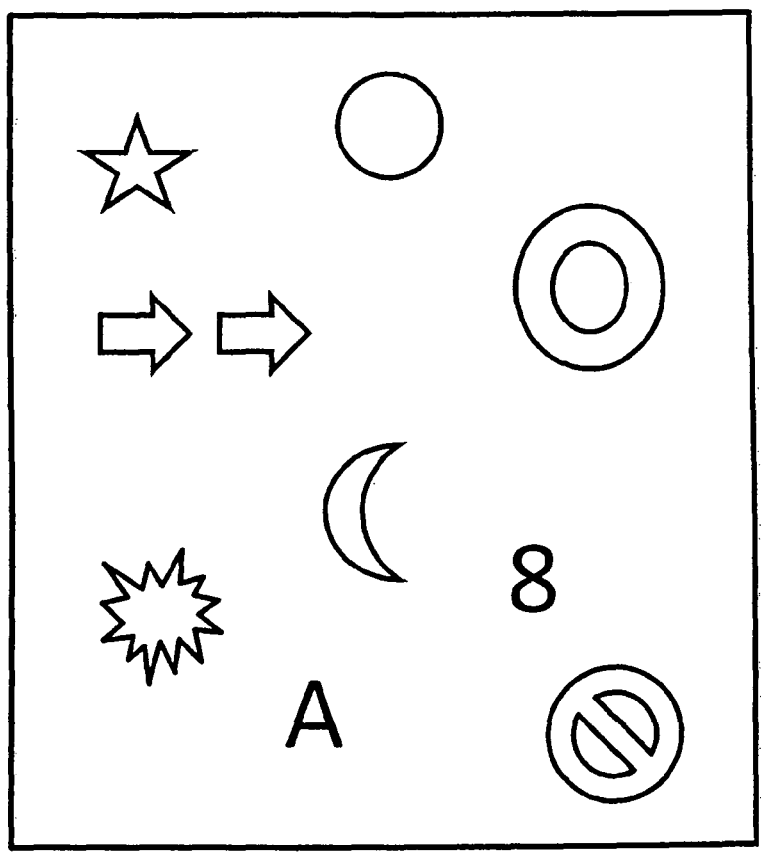
FIG. 1 is a schematic view of an embodiment of the present floor covering.

By way of example, FIG. 1 shows a floor covering with a matrix of elastomeric material that is provided with particles made of cross-linked thermoplastic elastomer. The particles are made from semi-finished products and available in a wide variety of forms. Merely by way of an example, the figure shows a floor covering containing particles having circular, annular, half-moon-shaped and star-shaped cross sections. The particles can differ from the matrix in terms of color, or else they can be configured to be transparent, so that the floor covering is partially translucent.

Figure 2:
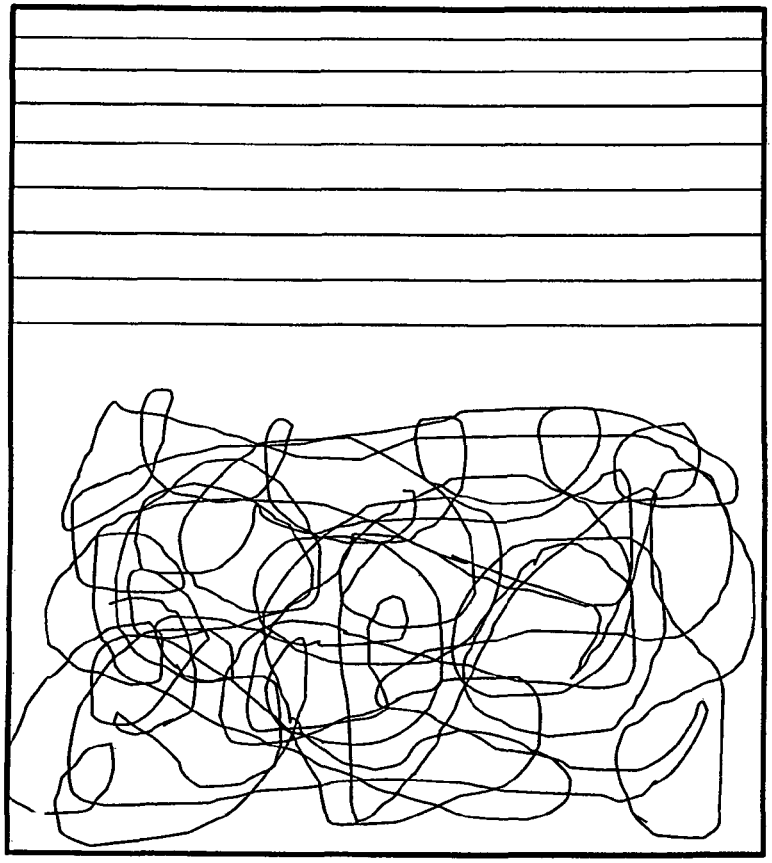
FIG. 2 is a schematic view of another embodiment of the present floor covering.

FIG. 2 shows a floor covering according to FIG. 1, wherein the particles in this embodiment are configured in the form of bands and strings. FIG. 2 also shows the arrangement of the particles in the form of strips and as a random spaghetti pattern.

EXAMPLE 1

The floor covering consists of a plate-shaped matrix made of elastomeric material; in this embodiment, it is made of styrene butadiene rubber (SBR). The matrix is provided with transparent particles of a thermoplastic elastomer; in this embodiment, it is made of a styrene butadiene block copolymer (SBS).

In order to produce the particles, first of all, an extruded profile was produced by means of extrusion as a semi-finished product that was subsequently cut to size. This gave rise to particles with a prescribed profile in a prescribed length. These particles were exposed to an ionizing $\gamma$ radiation source at a radiation dose of 150 kGy, leading to a cross-linking of the thermoplastic elastomer. The particles cross-linked in this manner were added to the elastomeric material, subsequently the elastomeric material was mixed with the particles, shaped into a sheet by means of calanders, and subjected to a thermal treatment at 160° C. in order to vulcanize the SBR. During the mixing process, a high energy input in the range of 4 kW/kg of the mixture was applied to the raw compound containing the elastomeric material and the thermoplastic elastomer. This mechanical energy input is ultimately converted into heat due to severe shear stress, a process in which the particles remain stable. An advantageous effect of the mixing procedure is the particularly homogeneous distribution of the particles in the matrix and thus particularly homogeneous material properties of the floor covering. During this mechanical and thermal treatment, the particles will have remained dimensionally stable. Due to the matching monomer, namely, styrene, the particles are firmly incorporated into the matrix of the floor covering. Here, the particles reach all the way to the surface of the floor covering so that the particles form a prescribed pattern on the floor covering.

EXAMPLE 2

After the mixing step, the floor covering described in Example 1 is shaped into a sheet with a double layer thickness and subsequently split by means of a circular blade into two sheets having the same thickness. After the floor covering has been laid, the surfaces created by the splitting form the sides facing away from the floor. Due to the splitting, the particles clearly come to the fore on the newly created surface; this is especially advantageous when the particles are at least partially covered on the surfaces of the unsplit sheet due to the material of the matrix having overflowed during the calandering process. The translucent effect of the particles is very evident, particularly when transparent particles are used. This effect can be improved even further by grinding the two backs of the floor covering.

A floor covering system, comprising a floor covering according to the invention with transparent particles and a translucent adhesive, preferably an acrylate adhesive, especially a cyanoacrylate adhesive, exhibits an especially attractive effect in conjunction with illumination coming from the floor, that is to say, from the back.

EXAMPLE 3

The floor covering consists of a plate-shaped matrix made of an elastomeric material; in this embodiment, it is made of nitrile butadiene rubber (NBR). The matrix is provided with particles of different colors made of a thermoplastic elastomer; in this embodiment, it is made of styrene butadiene block copolymer (SBS). In order to produce the particles, first of all, a flat layer was made as the semi-finished product, which was subsequently shredded to form particles. These particles were exposed to an ionizing γ radiation source at a radiation dose of 150 kGy, leading to a cross-linking of the thermoplastic elastomer. In order to produce the matrix, the elastomeric material was mixed and shaped into a sheet using calanders. The particles were scattered onto the so formed sheet and the sheet with the particles scattered onto was subsequently vulcanized. During the scattering step, it is advantageous that relatively few particles are needed to obtain an attractive surface. Subsequently, the sheet underwent a thermal treatment at 160° C. in order to vulcanize the SBR. During this mechanical and thermal treatment, the particles remained dimensionally stable. Due to the matching monomer, namely, styrene, the particles are firmly incorporated into the matrix of the floor covering. Here, the particles reach all the way to the surface of the floor covering so that the particles form a prescribed pattern on the floor covering.

The following table shows material combinations according to the invention made of elastomeric materials and thermoplastic elastomers for the production of a floor covering according to the invention:

| nitrile butadiene rubber (NBR) | SBS (styrene butadiene block copolymer) |
| styrene butadiene rubber (SBR) | SBS |
| SBR | SEBS (hydrogenated SBS) |
| SBR | SIS (styrene isoprene block copolymer) |
| SBR | SEBS |
| butadiene rubber (BR) | SBS |
| ethylene propylene diene monomer rubber (EPDM) | SEBS |
| natural rubber (NR) | SIS |
| isoprene rubber (IR) | SIS |

When a matrix of thermoplastic elastomer is selected, the material combinations according to the invention likewise have preferably matching monomers.

The invention claimed is:

1. A floor covering, comprising:
    an essentially sheet-shaped or plate-shaped matrix made of an elastomeric material and including particles,
    wherein the particles are made of a thermoplastic elastomer and are pretreated by means of ionizing radiation, and
    wherein a hardness of the elastomeric material is essentially equal to a hardness of the thermoplastic elastomer.

2. The floor covering according to claim 1, wherein the elastomeric material of the matrix is made of a thermoplastic elastomer or a rubber.

3. The floor covering according to claim 1, wherein the particles are made from semi-finished products.

4. The floor covering according to claim 1, wherein the particles are configured to be at least partially transparent.

5. The floor covering according to claim 1, wherein the elastomeric material of the matrix and the thermoplastic elastomer of the particles each have at least one matching monomer.

6. A method for producing a floor covering comprising:
    making particles with a thermoplastic elastomer;
    treating the particles with ionizing radiation; and
    mixing the treated particles into an elastomeric material that is further processed into one of a sheet-shaped or plate-shaped matrix,
    wherein the thermoplastic elastomer has a hardness that is essentially equal to a hardness of the elastomeric material.

7. The method according to claim 6, wherein the treatment of the particles with ionizing radiation is carried out in such a way that the particles retain dimensional stable during the further processing with the elastomeric material to form a floor covering.

8. The method according to claim 6, wherein the treatment with ionizing radiation involves irradiation with at least one of β and γ rays.

9. The method according to claim 6, wherein the further treatment comprises at least one mechanical shaping processes and a thermal treatment.

10. The method according to claim 5, wherein the particles are made of a semi-finished product.

11. A floor covering system, comprising a floor covering according to claim 1, wherein the particles are especially configured at least partially to be transparent, and wherein the floor covering is glued onto a floor with a transparent adhesive.

* * * * *